Oct. 17, 1967 — D. W. ROLLINS — 3,347,506
COLLAPSIBLE HITCH

Filed March 11, 1966 — 3 Sheets-Sheet 1

INVENTOR.
DALLAS W. ROLLINS
BY Eugene N. Riddle
ATTORNEY

Oct. 17, 1967    D. W. ROLLINS    3,347,506
COLLAPSIBLE HITCH
Filed March 11, 1966    3 Sheets-Sheet 2
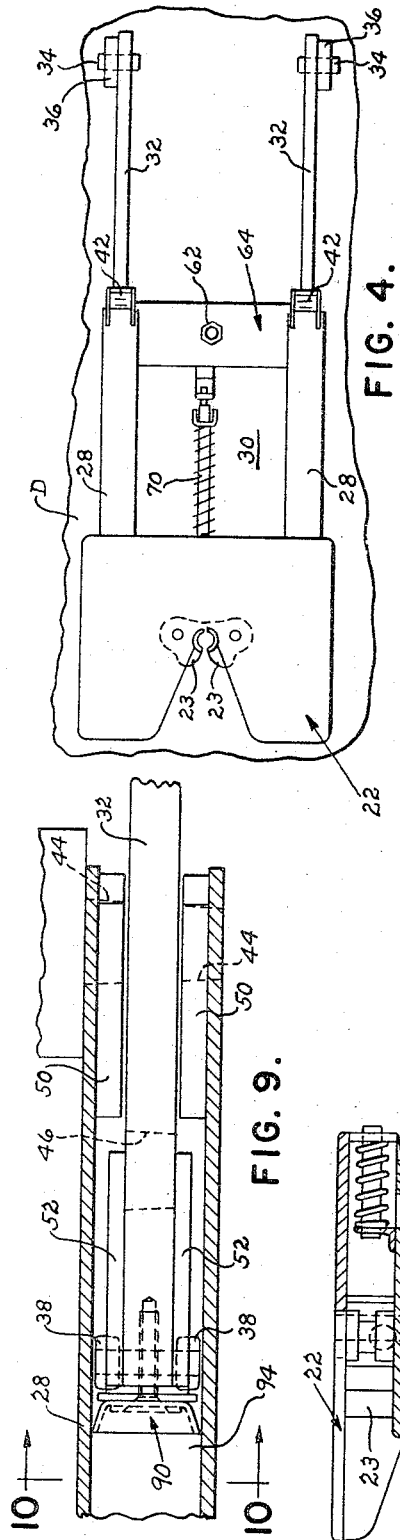
FIG. 4.
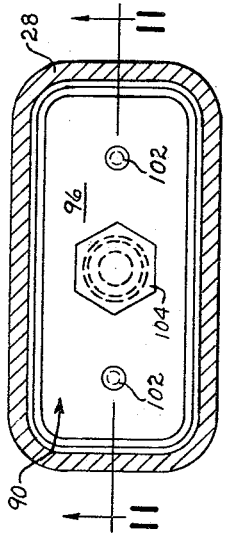
FIG. 10.
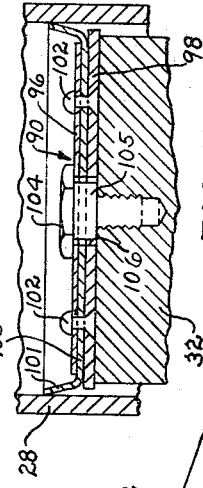
FIG. 11.
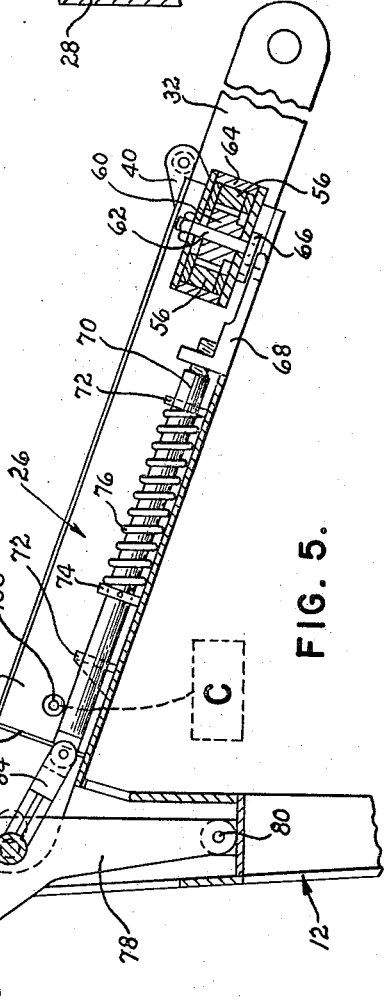
FIG. 5.
FIG. 9.

Oct. 17, 1967                 D. W. ROLLINS                3,347,506
                             COLLAPSIBLE HITCH
Filed March 11, 1966                                  3 Sheets-Sheet 3

United States Patent Office 3,347,506
Patented Oct. 17, 1967

3,347,506
COLLAPSIBLE HITCH
Dallas W. Rollins, St. Charles, Mo., assignor to ACF Industries, Incorporated, New York, N.Y., a corporation of New Jersey
Filed Mar. 11, 1966, Ser. No. 533,661
3 Claims. (Cl. 248—119)

ABSTRACT OF THE DISCLOSURE

A collapsible hitch movable between erect and collapsed positions and having a diagonal support formed of a pair of telescoping portions. One telescoping portion provides an air chamber and the other portion forms a piston within the air chamber to effect cushioning of the fall of the hitch during substantially the entire movement of the hitch from erect position to collapsed position. The hitch may be erected from collapsed position upon supplying air to the air chamber.

*Background and description of the invention*

Many of the collapsible hitches are tractor operated, that is, the hitches are raised to an erect position by a tractor and are knocked down or collapsed by a tractor. Hitches oftentimes fall from an erect position to a collapsed position with a relatively large force. This sometimes results in a damage to the floor of the car or to the hitch, especially after prolonged use.

The present invention is particularly directed to means for cushioning the fall of the hitch from erect to collapsed positions thereby to protect the hitch and associated flat car. This invention comprises air cushion means formed in the diagonal support of a collapsible hitch. The diagonal support includes a pair of telescoping portions forming an air chamber and associated piston which contract during the entire movement of the hitch from an erect position to a collapsed position for cushioning the fall of the hitch during the entire travel of the hitch to collapsed position. The telescoping portions extend during the entire travel of the hitch from the collapsed position to erect position to permit the erection of the hitch upon supplying air to the air chamber in the collapsed position of the hitch.

It is an object of the present invention to provide a collapsible hitch movable between erect and collapsed positions and means to cushion the fall of the hitch as it moves from erect position to collapsed position.

A further object of this invention is the provision of such a collapsible hitch in which air cushion means is provided to cushion the fall of the hitch with the controlled release of air during the fall of the hitch resulting in a shock absorbing action and a subsequent decrease in the rate of movement from erect to collapsed positions.

Another object is the provision of a collapsible hitch which is moved to an erect position from collapsed position by air pressure means operatively connected to the hitch.

The invention accordingly comprises the constructions hereinafter described, the scope of the invention being indicated in the following claims.

In the accompanying drawings, in which one of various possible embodiments of the invention is illustrated, FIGURE 1 is an elevational view of a pair of coupled railway cars having a trailer mounted on one of the railway cars and secured by a hitch engaging the kingpin of the trailer, a tractor being shown for raising and lowering the collapsible hitch;

FIGURE 4 is a plan view of the hitch shown in FIGURE 2 in raised position;

FIGURE 5 is a partial side elevational view of the hitch with certain parts broken away and illustrating the locked position of the hitch when erected;

FIGURE 9 is a plan view of the means to align the movable portions forming the diagonal support, certain parts broken away;

FIGURE 10 is a sectional view taken generally along line 10—10 of FIGURE 9 and illustrating the valve means on the end of one of the diagonal portions to compress air for a controlled release thereof when the hitch moves to collapsed position; and FIGURE 11 is a sectional view taken generally along line 11—11 and illustrating the valve means shown in FIGURE 10.

Corresponding reference characters indicate corresponding parts throughout the several views of the drawings.

Figure 1:
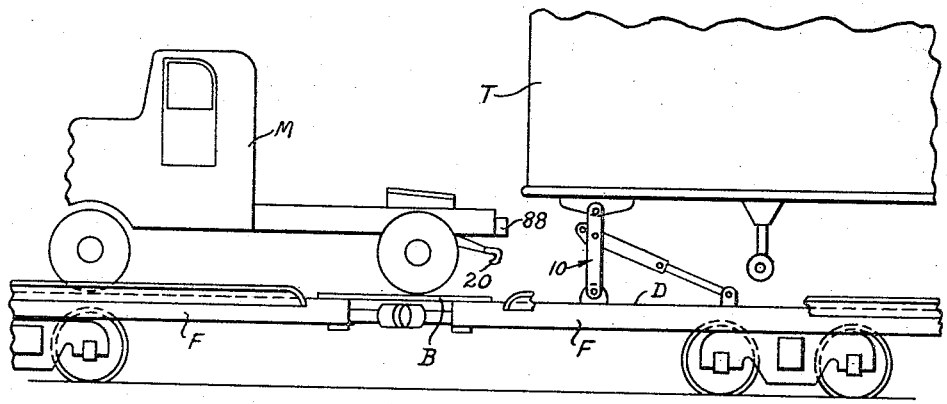

Referring to the drawings, and particularly to FIGURE 1, two railway cars F are coupled to each other and their decks or floor D are spanned by bridge plates B. A tractor M may be supported on bridge plates B when moving from one flat car to another. Each flat car F is adapted to carry two highway trailers T. To secure trailers T on flat car F, a collapsible trailer hitch or support indicated generally at 10 is provided for each trailer T, one hitch being mounted adjacent one end of flat car F and the other hitch 10 being mounted intermediate the ends of the car. Each trailer T has a kingpin extending from its front end which is engaged and locked in position to hold the associated trailer in secured position.

Referring to FIGURES 2–5, hitch 10 is shown mounted on the deck or floor D of the railway car. A vertical support is generally indicated at 12 and is pivotally connected at 14 to lugs 16 secured to deck D. Leg 12 has a pocket defined at its lower end by a transverse bar 18. A hook 20 on the rear end of tractor M is provided to fit within the pocket of leg 12 and engage bar 18 for raising hitch 10 from the collapsed position shown in FIGURE 3 to the erect position shown in FIGURE 2. Hook 20 may be raised and lowered by suitable controls (not shown) in the cab of tractor M. When bar 18 is engaged by hook 20, tractor M is driven forwardly away from trailer T to pull the hitch to raised position.

Mounted on the extending end of leg 12 is a mounting plate or fifth wheel support structure indicated generally at 22. Mounting plate structure 22 has a pair of jaws 23 as shown in FIGURE 4 which are adapted to engage and secure the kingpin of trailer T. A lever 24 actuates a suitable linkage for controlling the opening and closing of jaws 22. For further details of mounting plate structure 22, reference is made to U.S. Patent No. 3,225,707, issued Dec. 28, 1965 to D. W. Rollins et al., and entitled, "Collapsible Support," the entire disclosure of which is incorporated by this reference.

Figure 7:
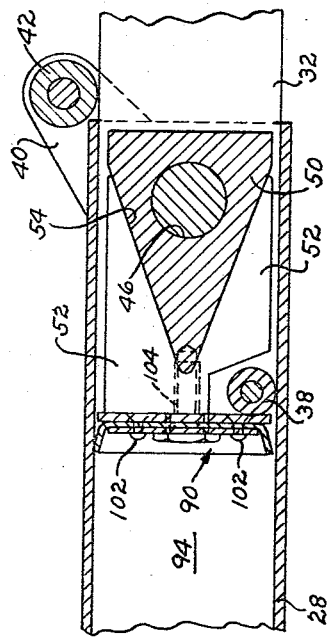
FIGURE 7 is a sectional view taken generally along line 7—7 of FIGURE 6.
Figure 8:
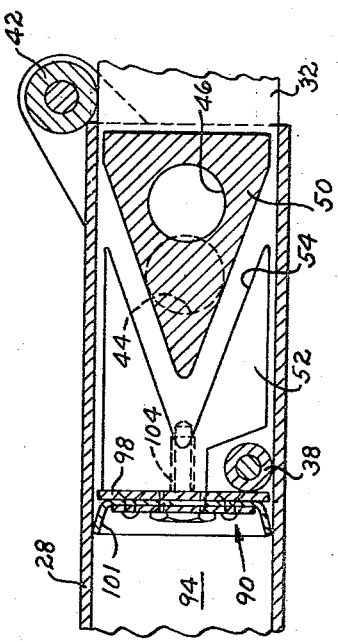
FIGURE 8 is a sectional view similar to FIGURE 7 but showing the relatively movable portions of the diagonal support out of aligned position.

To brace vertical support 12 and to transmit impact forces and the like from trailer T, a diagonal brace or support member generally designated 26 is provided. Diagonal support member 26 comprises a pair of upper box-shaped diagonal legs or arms 28 connected by a bottom plate 30. Telescoping within each box-shaped leg 28 is a separate lower leg or arm 32 having its lower end pivoted at 34 to a lug 36 secured to floor D. Carried by each leg 32 as shown in FIGURES 7 and 8 is a roller 38 for riding along the adjacent bottom surface of the associated leg 28. Mounted on projections 40 which extend beyond the lower ends of legs 28 are rollers 42 which ride along the adjacent upper surfaces of legs 32. Rollers 38 and 42 minimize the sliding friction between legs 28 and 32.

To hold legs 28 and 32 in proper aligned position when the hitch is raised, openings 44 are formed through the sides of each box-shaped upper leg 28 as shown in FIGURES 6–9. The extending end of each leg 32 received within upper leg 28 has an opening 46 for alignment with openings 44 when legs 28 and 32 are in extended positions. Locking pins 48 fit within aligned openings 44 and 46 to lock legs 28 and 32 together to prevent the hitch from collapsing.

Figure 6:
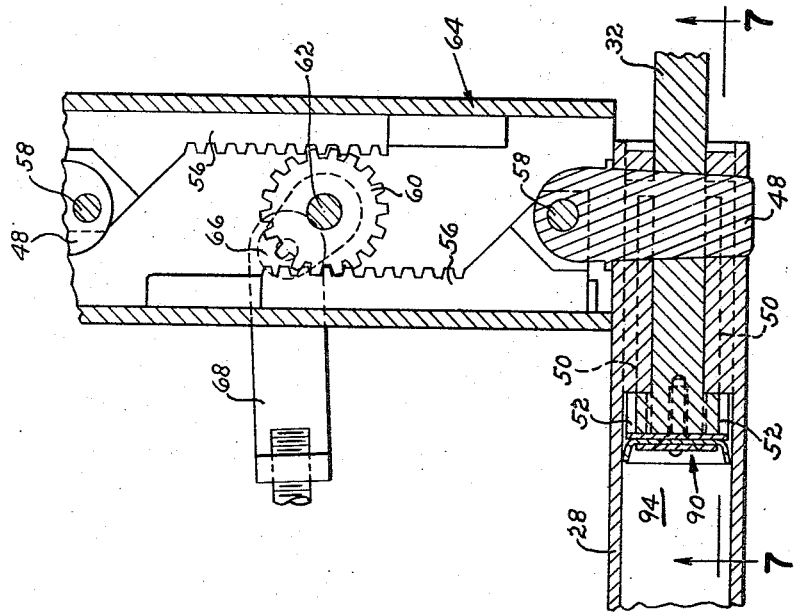
FIGURE 6 is a sectional view taken generally along line 6—6 of FIGURE 2 illustrating means to align and lock the movable portions of the diagonal support.

To align openings 44 and 46, the lower end of each leg 28 has a pair of oppositely disposed V-shaped lugs 50 extending toward each other from the inner side walls of the legs as shown in FIGURES 6–8. The end of each leg 32 received within leg 28 has lug portions 52 on the extending end thereof forming V-shaped slots 54. Each V-shaped slot 54 is shaped to conform with an aligned one of lugs 50 extending from the side surfaces of each leg 32. Once the pointed ends of lugs 50 contact the inclined surfaces defined by V-shaped slots 54, lugs 50 are guided by slots 54 into fully seated relation. Locking pins 48 are tapered and fit within openings 44 and 46.

Locking means are provided to remove the locking pins 48 in and out of their locking positions. The locking means include racks 56 having extensions connected at 58 to locking pins 48. A pinion 60 on shaft 62 engages racks 56. Racks 56 fit within a housing generally designated 64.

A lever 66 is fixed to the lower end of shaft 62 as shown in FIGURE 5. Pivotally connected to lever 66 is a link 68 connected to an actuating rod 70. Rod 70 is mounted for longitudinal movement within suitable openings in projections 72 secured to plate 30 of leg 26. The openings in projections 72 have sufficient clearance to allow a slight lateral movement of rod 70 upon actuation of pinion 60. A spring stop 74 is secured to rod 70. A spring 76 about rod 70 is mounted between projection 72 and stop 74 to bias rod 70 and pinion 60 in a counterclockwise direction as viewed in FIGURE 6 to urge locking pins 48 outwardly.

Figure 2:
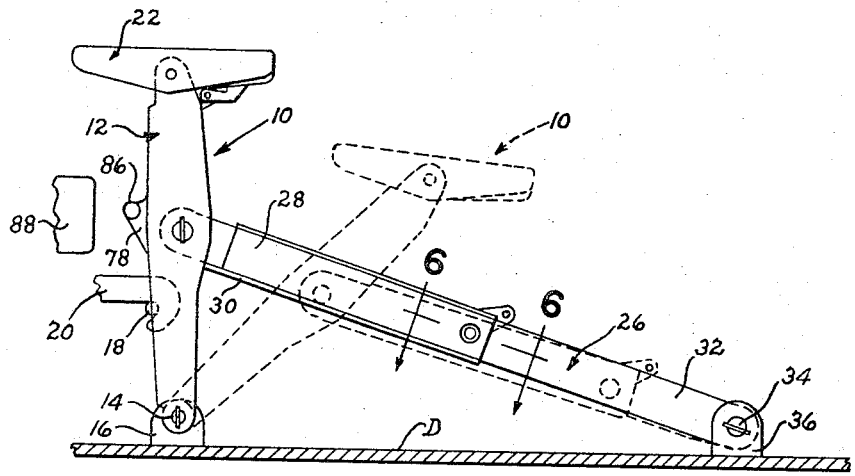
FIGURE 2 is a side elevational view of the hitch shown in FIGURE 1 in a raised position, the broken line indication of the hitch illustrating a partially collapsed position of the hitch.
Figure 3:
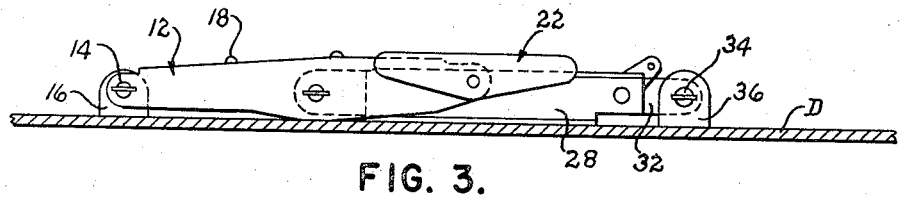
FIGURE 3 is an elevational view of the hitch of FIGURES 1 and 2 illustrating the hitch in the collapsed position.

To move rod 70 against the bias of spring 76, a push lever 78 is pivoted at 80 on leg 12. A connecting link 84 is pivotally connected to lever 78 and to rod 70. A projecting horizontal bar 86 on lever 78 is positioned forwardly of the vertical leg 12. To move hitch 10 from raised position to collapsed position, a bumper block 88 on the rear of tractor M as shown in FIGURES 1 and 2 is arranged at a height to engage bar 86 to pivot lever 78 inwardly upon a rearward movement of tractor M.

Upon rearward movement of tractor M, pusher bar 86 and lever 78 are pushed inwardly upon contact with bumper block 88. Initial movement of lever 78 actuates lever 24 for unlocking of the kingpin and also pulls locking pins 48 from openings 44 and 46 upon rotation of pinion 60. It is desirable to have locking pins 48 removed from openings 44 and 46 slightly before the unlocking of the kingpin so that no shearing action is exerted against locking pins 48 by relative movement of legs 28 and 32.

To raise the hitch from collapsed position, hook 20 engages bar 18 of leg 12 and tractor M is driven forwardly. V-shaped lugs 52 guide lugs 50 into slots 54 in a proper aligned position of legs 28 and 32. Pinion 60 is rotated under bias of spring 76 when openings 44 and 46 are aligned thereby to insert locking pins 48 in the openings. For further details of hitch 10, reference is made to the aforementioned U.S. Patent No. 3,225,707.

The momentum and weight of hitch 10 causes hitch 10 to strike floor D with a relatively large force, at times. Thus, it is desirable to provide means to cushion the fall of hitch 10 when the hitch is being collapsed. To accomplish this and constituting an important feature of this invention, the projecting free end of each leg 32 is arranged with a seal or valve assembly generally indicated at 90. Legs 28 are box-shaped and have closed ends 92 thereby to provide an enclosed space forming a cylinder 94 within each leg 28. Seal or valve assembly 90 acts as a piston when hitch 10 is collapsed to compress air within cylinder 94. Seal assembly 90 comprises a pair of metal plates 96 and 98 clamping a cup-shaped seal 100 suitably formed of leather or the like and having an outturned free peripheral marginal portion 101 adapted to fit against the inner surface of leg 28. Rivets 102, clamp plates 96, 98 and seal 100 together. A threaded stud 104 secures seal assembly 90 to leg 32. Stud 104 has a shoulder 105 engaging the face of leg 32 and acting as a spacer for seal assembly 90. Shoulder 105 is received by a large diameter opening 106 in seal assembly 90 which permits a lateral movement of seal assembly 90 relative to leg 32 and provides a loose fitting for seal assembly 90. Such a movement is desirable to maintain a controlled rate of air release from cylinder 94 upon collapsing of the hitch since leg 32 will ride against the adjacent surface of leg 28 at times. As the peripheral marginal portion 101 of seal 100 is flexible and pliant, air leakage occurs about the periphery of seal 100 as the hitch is collapsed and air within cylinder 94 is being compressed. There is also some air leakage about stud 104. The air leakage is at a rate to provide an adequate cushioning from the compressed air within leg 28. If desired, a substantially air-tight seal could be provided with a separate valve to release air at a controlled rate.

Relative movement between legs 28 and 32 when the hitch moves to collapsed position is around twenty-four (24) inches which provides a stroke for seal assembly 90 of around twenty-four (24) inches. It has been found that suitable cushioning may be obtained for cushioning the fall of hitch 10 in providing only one leg 32 with a seal assembly 90.

Another feature of this invention is provided in the erection of hitch 10 from a collapsed position without the use of a tractor. A source of gas, such as an air compressor C as shown diagrammatically in FIGURE 5, supplies air to a suitable fitting 108 on the inner side of one box-shaped leg 28 which communicates with the associated air cylinder 94. Air supplied under pressure to one cylinder 94 exerts a pressure against the seal assembly 90 on the associated leg 32 to extend leg 32 thereby erecting hitch 10 without the use of a tractor or the like. As marginal portion 101 of seal 90 trails the direction of movement when leg 32 is extended, the air within cylinder 94 tends to urge marginal portion 101 against the inner periphery of the adjacent leg 28 thereby providing a substantially air-tight sealing arrangement for erection of hitch 10.

From the foregoing, air cushion means has been illustrated to cushion the fall of hitch 10 from erect to collapsed position. Hitch 10 may also be erected by the same air means employed for cushioning the fall of hitch 10. The term "air" as employed in the specification and claims herein is to be interpreted as including any gaseous fluid which may be suitably employed with this invention, such as nitrogen gas or helium gas.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A collapsible hitch adapted to be mounted on a railway flat car, a generally vertical support member movable between a collapsed position and a generally vertical erect position, means carried by the extending end of the support member adapted to engage the kingpin of a trailer or the like, a diagonal support member connected to the vertical support member on the side thereof adjacent the trailer or the like, said diagonal member having a pair of telescoping portions movable toward each other during substantially the entire movement of the hitch from an erect position to collapsed position and movable away from each other during substantially the entire movement of the hitch from the collapsed position to the erect position, the outer of said telescoping portions having an enclosed space therein forming an air chamber and the inner of said portions being received within the outer portion and having an extending end forming a piston within the air chamber, the movement of the piston when the hitch falls from an erect position to a collapsed position tending to compress air within the outer portion during substantially the entire movement of the hitch to the collapsed position for cushioning the fall of the hitch, means to releasably latch the hitch in erect position, and means to release said latch means for movement of the hitch from erect position to collapsed position.

2. A collapsible hitch as set forth in claim 1 wherein the inner of said telescoping portions has seal means fitting on the extending end thereof forming said piston to compress air within the outer portion, said seal means fitting loosely within said outer portion and permitting an air leakage about the periphery thereof to provide a passage means for the release of air.

3. A collapsible hitch as set forth in claim 1 wherein said hitch may be moved to erect position from collapsed position upon supply of air to the air chamber and extension of said telescoping portions.

References Cited

UNITED STATES PATENTS

| 1,736,410 | 11/1929 | Longwell | 188—88.501 |
| 2,042,443 | 5/1936 | Buckstone. | |
| 2,821,268 | 1/1958 | Carbon | 188—88.501 X |
| 3,190,595 | 6/1965 | Ferris | 248—119 |
| 3,225,707 | 12/1965 | Rollins et al. | 105—368 |
| 3,246,866 | 4/1966 | Price et al. | 248—119 |

ROY D. FRAZIER, *Primary Examiner.*

ROBERT P. SEITTER, *Assistant Examiner.*